Figure 4:
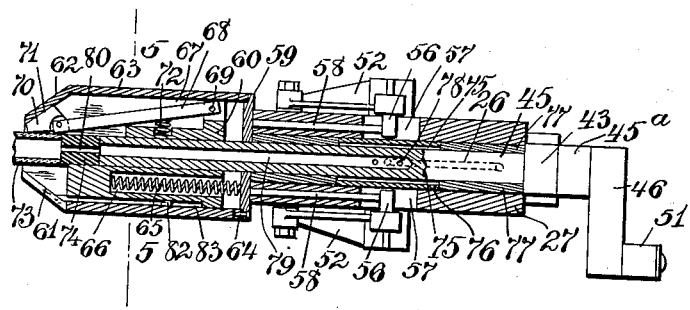

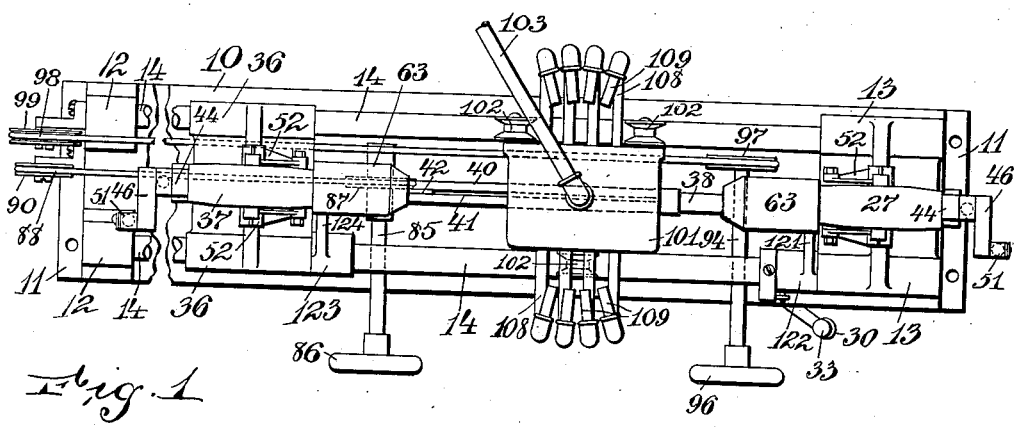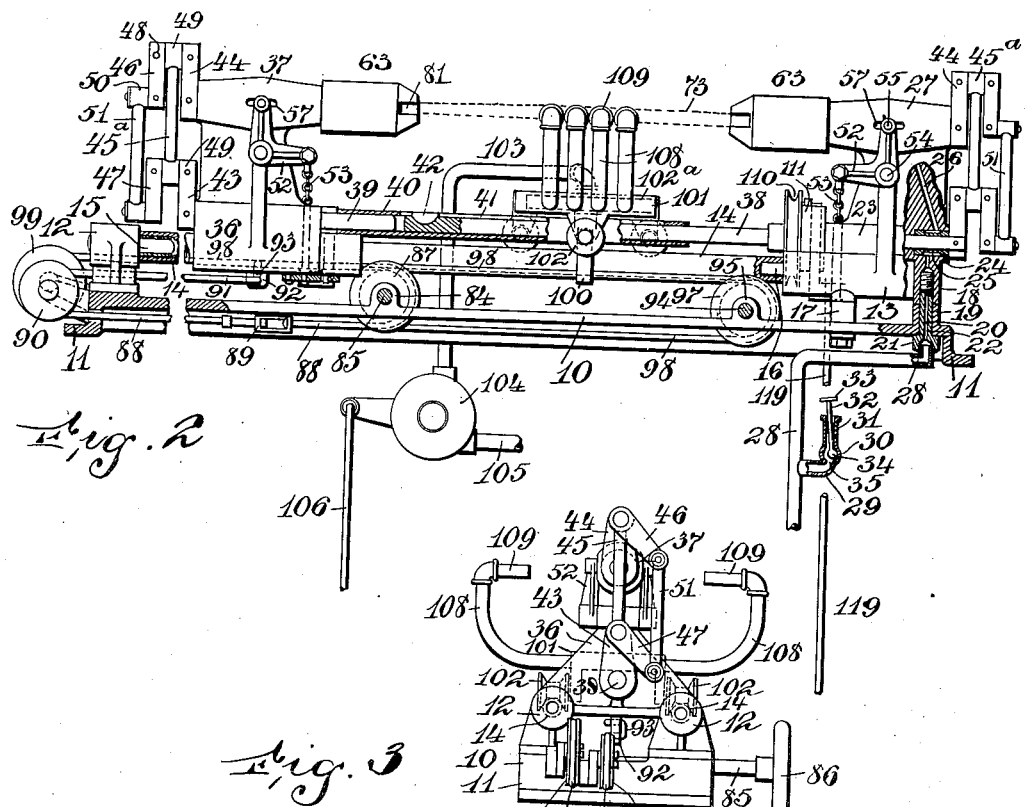

H. E. AND C. L. QUACKENBUSH.
GLASS BLOWING APPARATUS.
APPLICATION FILED MAY 13, 1916.

1,313,205.

Patented Aug. 12, 1919.
3 SHEETS—SHEET 2.

INVENTOR
Harvey E. Quackenbush,
and Clinton L. Quackenbush,
BY
Dyke & Canfield
ATTORNEYS

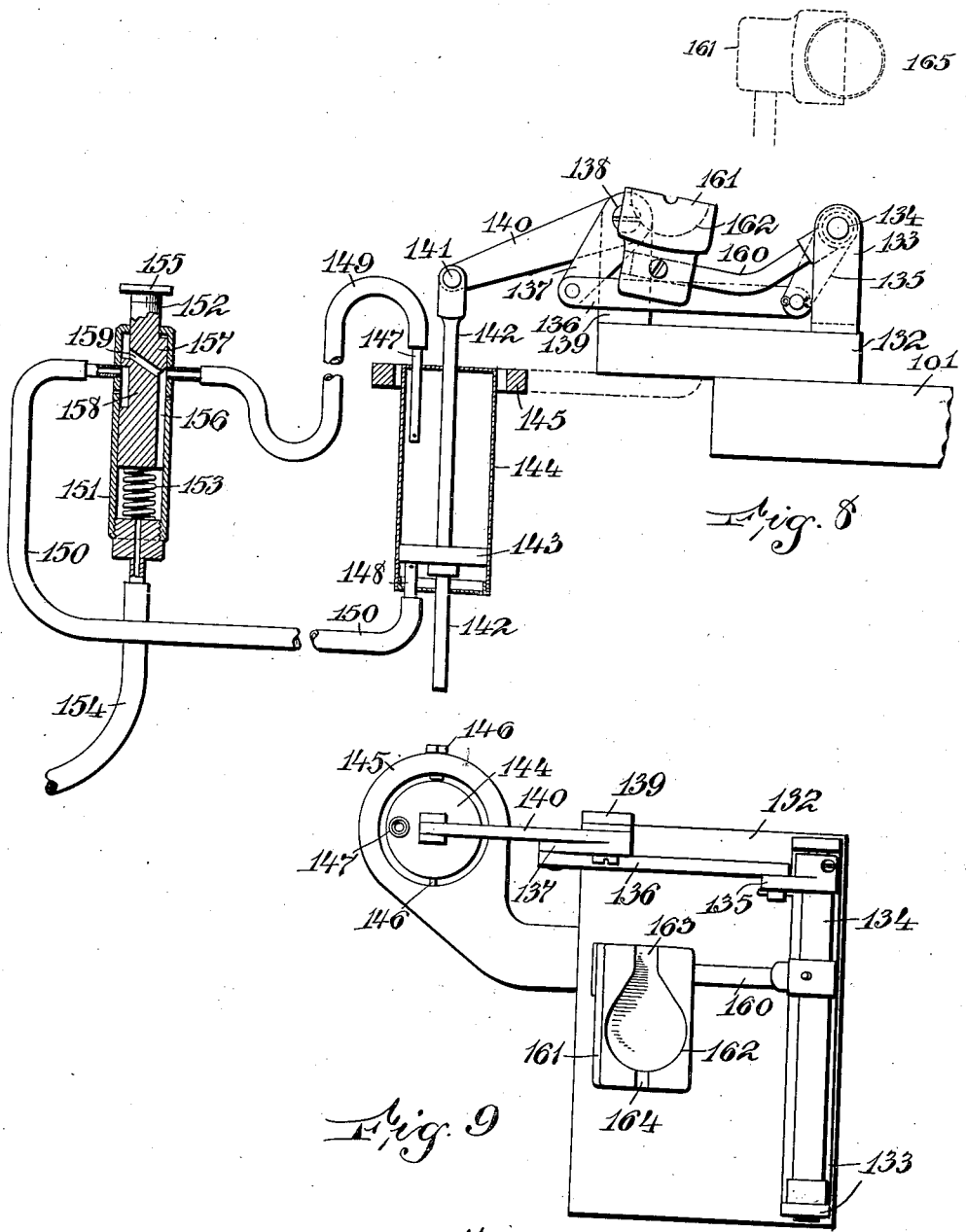

UNITED STATES PATENT OFFICE.

HARVEY E. QUACKENBUSH AND CLINTON L. QUACKENBUSH, OF BLOOMFIELD, NEW JERSEY, ASSIGNORS, BY MESNE ASSIGNMENTS, TO GENERAL ELECTRIC COMPANY, A CORPORATION OF NEW YORK.

GLASS-BLOWING APPARATUS.

1,313,205.       Specification of Letters Patent.       Patented Aug. 12, 1919.

Application filed May 13, 1916. Serial No. 97,218.

*To all whom it may concern:*

Be it known that we, HARVEY E. QUACKENBUSH and CLINTON L. QUACKENBUSH, citizens of the United States, and residents of Bloomfield, county of Essex, and State of New Jersey, have invented certain new and useful Improvements in Glass-Blowing Apparatus, of which the following is a specification.

This invention relates to a machine for blowing bulbs from tubes of glass, these bulbs being of different kinds, the machine, however, being particularly adapted for making bulbs such as are used for incandescent electric lamps and similar purposes.

The invention relates to a machine of this kind in which the glass tube is rotated without being subjected to a torsional strain so that when the glass is molten at an intermediate point in its length, it will be sustained at such point without torque, whereby the glass bulb can be treated at points along its length, these treatments being successive, and the stick can thus be converted into a series of bulbs arranged end to end.

The machine is further designed to provide holding means for the glass tube, the holding means being adapted to be movable toward and from each other, this being usually accomplished by making one of the chucks, in which the tube is held, fixed and the other movable so that the glass can be stretched or pulled when it is molten, said holding means also providing for the introduction of air to the inside of the tube of glass so that at a softened or molten place the glass can be expanded to enlarge the diameter of the tube. The invention is further designed to provide a regulating means for controlling the air admitted through the holding means to the glass tube.

The invention is further designed to provide a machine of this kind in which the heat-applying means is movable and can be operated to shift the heat that is applied to the tube so that any selected point in the tube can be subjected to the required heat to cause it to soften or melt so that it is easily pliable and can be transformed, either by stretching or expansion, into the different articles desired.

The invention is further designed to provide a clutch for stopping and starting the machine, the clutch being so constructed, in connection with the chucks or gripping means for the tube, that the chucks cannot be actuated to release the tube until the machine has been disconnected from its source of power and is stopped, and vice versa the machine will not start until the chucks are closed so as to prevent the starting of the machine with the glass tube only partly inserted or insecurely fastened.

The invention is further designed to provide means for insuring the operation of the chucks that hold the glass tube so that they rotate in unison without lost motion, said means being also calculated to remove the chances of uneven or intermittent rotation.

The invention is further provided with means for positively holding the glass tube, said means consisting of chucks which are designed to operate in a positive manner and to insure the rotation of the glass tube, said chucks occupying minimum space and at the same time providing a convenient and ready means for receiving the ends of the tube.

The invention provides means for operating the glass-holding means and also the heat-applying mechanism so that they can be shifted at the will of the operator of the machine to distribute the heat along the tube and also to manipulate said tube, the means for holding the heat-applying means and the regulating means for the air supplied to the tube being arranged in proximity so that they can be operated by one hand of the operator, the other hand being employed to shift the glass-holding means.

The invention further consists in means for engaging the side of the rotating and molten glass tube to form it into the shape desired, whether a bulb or any other form, since the tendency of the bulb will be to take up a round form. The means we have devised will form the molten part of the glass, while it is expanding, into uneven or any other desired forms. The means for forming the molten glass consists of a half mold, that is, a mold that engages one half the tube at a time and acts also as a gage for limiting the expanding of the bulb or form, as the glass usually is cooled by the time it is expanded to the limits of the form prescribed.

Figure 5:
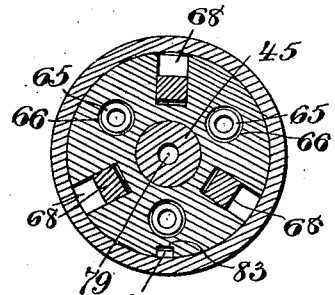
Figure 6:
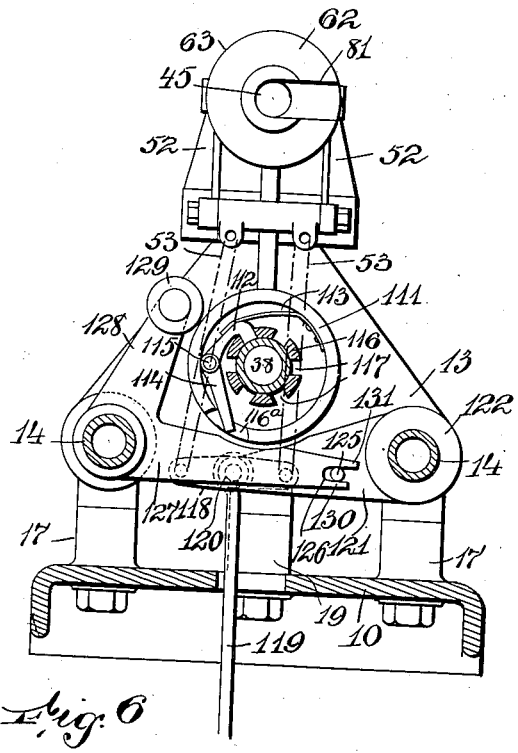
Figure 7:
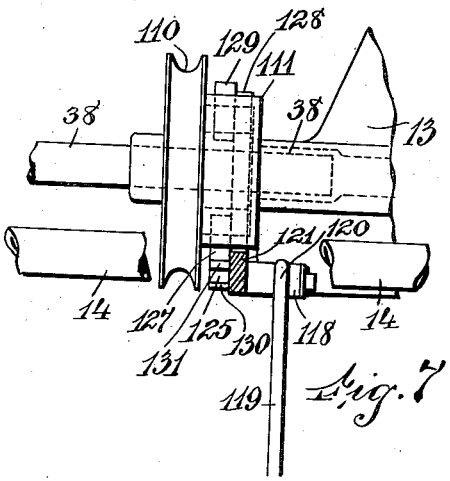

The invention also consists of details of construction illustrated in the drawings and fully described in the specification and finally embodied in the clauses of the claim.
The invention is illustrated in the accompanying drawings, in which Figure 1 is a top view of the machine with the left end broken away so as to condense the machine into the space required, the machine being preferably longer in proportion to its length, the excess length being represented by the part that is broken away. Fig. 2 is a front view of the machine illustrated in Fig. 1, the machine being broken away at some points to better illustrate the interior construction of the device. Fig. 3 is an end view of the machine shown in Figs. 1 and 2. Fig. 4 is a central horizontal section of one of the chucks used in the machine, and Fig. 5 is a section on line 5—5, in Fig. 4, the section being on a larger scale than Fig. 4. Fig. 6 is a detail of the clutch mechanism of the machine, and Fig. 7 is a side view of a portion of the parts shown in Fig. 6. Fig. 8 is an end view of the molding device that is used on the machine, and Fig. 9 is a top view of the same.

It will be understood that minor changes can be made in the machine as hereinafter described, but the description and illustration are confined to a machine of the preferred type.

The machine illustrated consists of a base 10 with the feet 11 at the ends to raise the central portion of the base from a table or stand on which it is placed, the base having one end thereof provided with bearings 12 arranged on the opposite sides of the base, the other end of the machine having bearings 13, the bearings 13 and the bearings 12 coöperating to support the guides or tracks 14, which tracks act as supports for the flame-carrying device or heat-applying means, said guides also acting to support the traveling or movable chuck and its supporting structure, as will be hereinafter described. Said tracks 14 are preferably made in the form of tubes which fit on the studs 15 and 16 on the bearings 12 and 13, respectively, as will be clearly seen from Fig. 2. The bearings 13 form the supporting elements of the fixed chuck, the bearing being mounted on bosses 17 on the base 10 and also having a boss 18 resting on the boss 19 of the base. The bosses provide for the securing of the bearing or support 13 to the base 10 and also act to provide means for supplying air through the fixed chuck to the glass tube. This is provided by means of a screw 20 which is screwed up through the bosses 18 and 19 and has a head 21 thereon and which also has a central channel 22 for the passage of air. The support 13 has a central bearing 23 which is provided with a sleeve 24 that is cut away as at 25 so that the air entering through the passage 22 enters into the cut-away part 25 and passes around the sleeve 24, and then up through a duct 26 on the inside of the center of the barrel 27, a further conducting means for the air being described hereinafter. At the end of the head 21 is arranged an inlet pipe 28 having a by-pass 29 thereon with an outlet 30, the outlet 30 having an upright portion 31 thereon, and a stem 32 freely rests on the upright portion having a finger-piece 33 on its top end and a ball 34 on its bottom end, the ball being adapted to be seated in the narrowed portion 35 of the by-pass 29. It will thus be seen that the air which is led in through the pipe 28 from any suitable source of supply will normally pass out through the by-pass 29, but when air is to be delivered to the machine, by a simple pressure on the finger-piece 33 the ball 34 is pressed to its closed position and the air is compelled to pass up through the channel in the support for the fixed chuck.

Sliding on the bars or tracks 14 is a carriage 36 which has mounted thereon a barrel 37, the whole constituting a support for the movable chuck and being duplicates of the bearing 13 and the barrel 27, except that they are movable. Passing through the center part of the bearing 13 and also through the central part of the carriage 36 are shafts 38 and 39 respectively, these shafts being arranged in line, the shaft 39 having a sleeve 40 thereon which extends over the shaft 38, which sleeve is slotted as at 41 to receive a feather 42, this insuring the rotation of the shafts 39 and 38, at the same time permitting the longitudinal movement of the shaft 39. At the projecting ends of the shafts 38 and 39 are arranged double cranks, the cranks at each end being the same and consisting of cranks 43 which have the same throw as cranks 44 mounted at the ends of the barrels 27 and 37 and being connected to a shaft 45 in each barrel, which shaft extends through and is connected up with the chucks, as will be hereinafter described. The cranks 43 and 44 are connected by pitmen 45ª. Crank arms 46 and 47 are arranged at an angle to the arms 43 and 44 and are fixed at this angle, the usual way being to pin the arms, by means of pins 48, to the short shafts 49. On the ends of the arms 46 and 47 are rigidly secured short shafts 50 which are connected by pitmen 51. The pitmen are free to rotate at their ends on the short shafts 49 and 50, and this arrangement of cranks causes a positive and insured rotation of the two ends of the shafts and the transmission of their rotation to the shafts within the chuck bearings or barrels 27 and 37, whereby the rotation of the chucks is positive and in unison so that a bar of glass mounted between them and rotated by them is not subjected to any torsional strain.

The chucks are operated together, that is, to open and close them, one chuck being shown in detail in Figs. 4 and 5, the chuck selected for illustration being the one on the fixed end of the tube supporting means, and this is selected because it can also illustrate the manner of passing the air through the chuck into the glass tube that is being manipulated.

On each side of each barrel is a bell crank 52, which bell cranks are operated by chains 53 by means to be hereinafter described, the bell cranks being pivoted at 54 and having their upper ends 55 provided with studs 56 projecting into slots 57 in the sides of the barrels. Each stud bears against a rod 58, these rods being adapted to slide in holes in the barrels and abutting on disk 59, the disks forming the rear end of the chuck. The shaft 45 of the chuck, which is rotatable in the barrel, projects beyond the barrel and the disk 59 is slidable on the shaft 45. The chuck body 60 is secured to the barrel so that it cannot move either longitudinally or rotatably on it and is provided with an inclined front 61 which is inclosed by a tapered end 62 of the sleeve 63, the sleeve being secured at its back end to the disk 59, this being usually done by means of screws 64. Springs 65 abut on one end on the disk 59 and on the other end on the chuck body 60, the chuck body being usually provided with recesses 66 in which these springs are seated, as will be evident.

Radial slotted portions 67 are formed in the chuck body, and in these are pivoted jaws 68 which swing on their back ends at 69 and have their front ends provided with fingers 70 which have inclined outer edges 71 to be moved by the inner faces of the inclined end 62 of the sleeve 63 of the chuck. Small springs 72 have a normal tendency to force the arms 68, and consequently the fingers 70, outward. It will thus be evident that when the chains 53 are pulled down, the bell cranks are operated to push the rods 58 forward, these in turn pushing the disk 59 and the sleeve 63 forward against the pressure of the springs 65, and this permits the springs 72 to throw the arms 68 and the fingers 70 outward and release the glass tube 73 from the grasp of the fingers.

The end of the shaft 45 is usually provided with a rubber block 74 so as to make a cushion against which the end of the glass rod rests. In the fixed chuck illustrated in Fig. 4 the air ducts 26 open onto the recessed or cut-away portion 75 of a sleeve 76 surrounding the shaft 45, the ends of the sleeve being closed by the sleeves 77 so that the air can only pass from the space 75 through the holes 78 into the longitudinal opening 79 in the shaft 45, and then pass through the opening 80 in the rubber block 74 and thus into the glass tube 73. When the chuck is in position to release the glass tube, or is open for the reception of the glass tube, the tube is inserted through a transverse slot or cutaway portion 81 in each chuck, these slotted away portions being in line in the opposed faces of the chucks as illustrated in Fig. 2, and stopping and starting devices, to be hereinafter described, are so adjusted that they shift the machine with the cut-away portions facing the operator so that it is convenient to insert and withdraw the glass tube from the chucks. To insure the simultaneous rotation of the chuck body 60 and the disk 59 we provide the sleeve 63 with a pin 82 which slides in a slot 83 in the chuck body so that the parts rotate together, as will be evident.

Mounted in suitably disposed bearings 84 on the base of the machine is a transverse shaft 85 provided with a hand wheel 86 for its operation, and having a pulley 87 thereon. Over the pulley 87 extends an endless belt 88 which can be tightened by a suitable turn-buckle 89, which belt passes from the pulley 87 and extends over the pulley 90 and then back underneath the carriage 36 as at 91, then through a plate 92 on said carriage, being passed through the plate in two directions, forming a loop 93, as will be evident from Fig. 3, this loop insuring the non-slipping of the belt and making a positive connection between the belt and the carriage 36, the belt extending from the plate 92 to the pulley 87. It will thus be evident that by operating the hand wheel 86 the carriage can be slid along the tracks 14 for purposes to be described hereinafter.

A second transverse shaft 94 is mounted in bearings 95 and has a hand wheel 96 at its forward end and is provided with a pulley 97. Over the pulley 97 passes an endless belt 98, which belt also passes over the pulley 99 and is connected as at 100 to a burner body 101 which is mounted on wheels 102 which rest on the tracks or guides 14. A supply pipe 103 leads from an economizer or mixing valve 104 which in turn receives its supply of gas through a pipe 105 from a suitable source of supply, the valve being of any ordinary type, being operated by a rod or cable 106 connected to a suitable treadle or foot lever. The gas passes through the pipe 103 and enters the burner body 101 which is hollow and incloses a chamber $102^a$, the burner body having projecting therefrom pipes 108, a number of these being supplied on each side and being provided with burners 109, the burners being so disposed that they concentrate their flame and heat at one point between them and in line with the glass tube that is held in the chucks 63. The valve or economizer 104 is usually arranged so that when it is shut off it still permits a slight quantity of fuel to pass through it so that pilot lights are kept burning on the burners.

The machine is driven from a pulley 110 which can be arranged to receive a belt which is driven from any desired source, the pulley forming part of a clutch which is illustrated in detail in Figs. 6 and 7. The pulley 110 rotates continuously and is provided with a barrel 111 in which is pivoted a pawl 112 normally held downwardly by a spring 113 and having a finger 114 beyond its pivot 115, the finger projecting into an opening 116$^a$ in the barrel 111. Mounted on the shaft 38 is a collar 116 provided with a series of recesses 117 which are made so that the pawl 112 can be seated in them. The chains 53 of the bell crank 52, mounted on the bearing 13, are connected to a plate 118 which is secured to the upper end of a bar or strand 119 which projects down to a suitable foot lever which is not shown in the drawing. The strand 119 also passes around a stud or finger 120 on the lever 121, the lever 121 having a collar 122 mounted on the forward bar or track 14 and being secured thereon so as to turn the same, and also at the same time turn a collar 123 of a lever 124 which operates the chains 53 of the chuck projecting from the barrel 37 so that the chains at both ends of the machine will be operated together. The lever 121 has a pin 125 thereon which fits into a slot 126 of a bell crank or L-shaped lever 127, the lever 127 having the arm 128 thereof provided with a roller 129 bearing against the periphery of the barrel 111. A finger 130 below the pin 125 is shorter than a finger 131 above the pin.

In Figs. 8 and 9 is illustrated a form of molding attachment to regulate the size of the bulb or other article to be blown from the glass, the mold being adapted to facilitate the formation of the bulb to insure its shape and also to be a gage for its proper diameter. We mount a base plate or any other suitable supporting means 132 on the burner support 101, the base having uprights 133 which support an oscillating bar 134. The oscillating bar has an arm 135 to which is pivoted a link 136, the other end of which is fastened to an arm 137 which is pivoted at 138 to an upright 139. The arm 137 has, extending therefrom, a lever 140 which is connected at its end, as at 141, with a piston rod 142, the piston rod having a piston 143 thereon which operates in the cylinder 144. The piston is adapted to be forced up and down in the cylinder by the admission of compressed air to the top and bottom of the cylinder 144. The cylinder is mounted in a bracket 145 and is pivoted by the pins 146 so that it can swing, the bracket 145 being secured to the supporting means 132. A pipe 147 leads into the top of the cylinder 144 and a pipe 148 is attached to the bottom of the cylinder, and pipes 149 and 150 lead from the pipes 147 and 148, respectively, to a valve 151 which has a plunger 152 therein normally held up by a spring 153. Air enters into the bottom of the valve by means of a pipe 154 which is supplied with air under slight compression from any suitable source, the plunger 152 having a finger-piece 155 on the top. When the spring 153 forces the plunger upward, the cut-away part 156 admits air through the pipe 149 and the piston 143 is pressed down so as to normally hold the piston in this position. When the finger-piece 155 is pushed down, the plunger is also depressed so that the part 157 closes the inlet of the pipe 149 and the portion 158 uncovers the inlet of the pipe 150 and the air can pass through the passage 159 through the pipe 150 to raise the piston 143.

Attached to the oscillating bar 134 is a finger 160 having a mold 161 adjustably secured on it, the mold having a depressed portion 162 which is formed to represent one-half of the article to be made from the glass tube. In the illustration this is shown as an electric light bulb, the depression 162 having its main portion to represent the bulb and having the part 163 to represent the neck of the bulb, and the narrow part 164 to serve as a connection between the bulb and the next succeeding one. The pipe 147 extends down on the inside of the cylinder 144 and it is adapted to be engaged by the piston 143 on its upward travel so that said pipe acts as a stop to limit the movement of the piston and to also limit the movement of the mold.

In dotted outlines in Fig. 8 we show the mold in its raised position and illustrating how it covers one-half of the bulb 165 and forms the bulb into the proper shape. As soon as the bulb has cooled sufficiently, which is usually by the time it has been expanded into the size of the mold, the mold can be lowered by releasing the finger-piece 155 and the burner carriage can be shifted to the next point to where a bulb is to be formed, as will be evident.

The operation of the device is as follows: It is assumed that the machine is not running and the driving pulley 110 is rotating. The bar 119 is pushed down by a suitable foot lever or any other suitable mechanism and the lever 121 is pulled down. It is halted by reason of the finger 125 in the slot 126, being held against further movement by the engagement of the roller 129 against the periphery of the barrel 111. When the opening 116ª, however, comes in register with the roller 129, the roller 129 drops in the opening 116ª and removes the pawl 112 from the opening 117 in which it is seated, and the barrel 111 is stopped. The additional movement of the lever 127, permitted by the passage of the roller 129 into the opening 116ª, permits the finger 125 to clear the lower finger 130 of the lever 127, and this permits the lever 121 to be still farther drawn down, which rotates the guide or track 14 to which it is attached, and the levers 121 and 124 are both pulled down together, the chains 53 actuating the bell cranks 52, and the chucks, by the means previously described, are open. A glass tube is now inserted in the chucks, and the chuck to the left being moved by the hand wheel 86 so that it receives one end of the glass tube and supports it, and then the rod or rope 119 is released. As the lever 121 ascends, the pin 125 hits the longer finger 131 of the lever 127, the roller 129 is swung out of the opening 116ª, and the spring 113 pushes the pawl 112 into the next recess 117 that passes it, these recesses being on the hub of the pulley 110 and the barrel 111 and the shaft 38 to which it is attached are now rotated with the pulley 110. The shafts 38 and 39 rotate together as above described and they also rotate the shafts in the chucks, and the chucks themselves are rotated so that the glass tube 73 is revolved and is ready for manipulation.

By means of the hand wheel 96 the burners and the burner support 101 are shifted to the point where it is desired to treat the glass tube, this being usually at the left end of the tube and the tube is heated by pushing down on the rod or strand 106 and permitting fuel to enter through the feed pipe 103 to the burners and they direct flame on the glass tube. If the glass is to be inserted, the hand wheel 86 is turned in one direction and the movable chuck, which is supported on the carriage 36, is drawn away from the fixed chuck and the stretching of the glass will cause it to be reduced in diameter. If, however, the glass is to be expanded into a bulb or ball, the movable chuck is permitted to remain stationary and the finger-piece 33 is pressed down to close the valve 30, and air then passes through the fixed chuck into the glass tube and slowly expands the tube to the required diameter. On the removal of the fingers from the finger-piece 33, the further entrance of any air under compression is prevented and the expanding of the glass tube ceases.

When the mold illustrated in Figs. 8 and 9 is used and the glass has been heated, the mold is brought up to a position adjacent to the glass and air is admitted to the glass tube to expand the glass tube to the shape represented by the mold, and when the bulb is of the form and size represented by the mold, the air is shut off and the mold is lowered to its inoperative position. The mold thus acts also to gage and regulate the size of the bulb.

We have found that points on the glass tube can be successively treated by means of the flame and then subjected to alternate stretchings and expansions so that a tube can be transformed into a series of bulbs, such as round bulbs or the elongated bulbs that are used in incandescent lights, and the manufacture of said bulbs is therefore made more rapid and economical.

The machine can be made of any suitable length consistent with the work to be performed thereon, and the operation of various parts of the machine is positive and the manual operation of the different parts to bring about results is easy on account of the convenient arrangement and the accessibility of the different portions of the machine.

Having thus described our invention, we claim:

1. A glass blowing apparatus comprising a frame having a fixed chuck mounted thereon, a movable chuck on the frame, manually operable means for moving the chuck, means for opening and closing the chucks in unison, means for rotating the chucks in unison, means for connecting and disconnecting the machine from a source of power, a connection between the disconnecting means and the chucks whereby the chucks cannot be opened until the disconnecting means has been operated, means for applying heat to a glass tube supported at its ends in the chuck, and means for admitting air through the fixed chuck to the glass tube.

2. A glass blowing apparatus comprising chucks adapted to hold a glass tube at its ends, means for rotating the chucks in unison, means for connecting and disconnecting the chucks from a source of power, means for opening and closing the chucks, said opening and closing means being so connected to the disconnecting means that the opening and closing means are inoperative while the machine is connected with its source of power.

3. A glass blowing apparatus comprising a fixed chuck, a movable chuck, the chucks being adapted to support a glass tube at its ends, means for rotating the chucks in unison, means for connecting and disconnecting the chuck rotating means from a source of power, means for opening and closing the chucks, and a connection between the chuck opening means and the disconnecting means whereby the opening means is halted until the disconnecting means is operated.

4. A glass blowing machine comprising a chuck having a passage therethrough, and means for supplying compressed air to said passage, said means comprising an inlet pipe having a by-pass connected thereto and said by-pass having an outlet which is normally open and means for closing said outlet comprising a seat and a valve mounted so as to be displaced from said seat by the air pressure and having an attachment whereby said valve may be seated at will by hand pressure applied to said attachment.

In testimony that we claim the foregoing, we hereunto set our hands, this 12th day of May, 1916.

HARVEY E. QUACKENBUSH.
CLINTON L. QUACKENBUSH.